United States Patent
Niina et al.

(10) Patent No.: US 11,430,983 B2
(45) Date of Patent: Aug. 30, 2022

(54) NONAQUEOUS ELECTROLYTE SECONDARY BATTERY

(71) Applicant: Panasonic Intellectual Property Management Co., Ltd., Osaka (JP)

(72) Inventors: Fumiharu Niina, Hyogo (JP); Takashi Ko, Hyogo (JP); Katsunori Yanagida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 272 days.

(21) Appl. No.: 16/495,937

(22) PCT Filed: Feb. 9, 2018

(86) PCT No.: PCT/JP2018/004548
§ 371 (c)(1),
(2) Date: Sep. 20, 2019

(87) PCT Pub. No.: WO2018/179901
PCT Pub. Date: Oct. 4, 2018

(65) Prior Publication Data
US 2020/0144606 A1 May 7, 2020

(30) Foreign Application Priority Data
Mar. 27, 2017 (JP) .............. JP2017-060565

(51) Int. Cl.
*H01M 4/131* (2010.01)
*H01M 4/36* (2006.01)
(Continued)

(52) U.S. Cl.
CPC .......... *H01M 4/366* (2013.01); *H01M 4/386* (2013.01); *H01M 4/505* (2013.01); *H01M 4/587* (2013.01); *H01M 10/0525* (2013.01)

(58) Field of Classification Search
CPC ...... H01M 4/366; H01M 4/386; H01M 4/505; H01M 4/587; H01M 10/0525; H01M 4/38;
(Continued)

(56) References Cited

U.S. PATENT DOCUMENTS

| 2012/0276446 A1 | 11/2012 | Kawai |
| 2013/0252031 A1* | 9/2013 | Ma .................. H01M 4/48 429/5 |
| 2016/0308202 A1* | 10/2016 | Kuriyama ............ H01M 4/485 |

FOREIGN PATENT DOCUMENTS

| JP | 2011-181355 A | 9/2011 |
| JP | 2011-181356 A | 9/2011 |

(Continued)

OTHER PUBLICATIONS

International Search Report dated May 15, 2018, issued in counterpart application No. PCT/JP2018/004548, with English translation. (4 pages).

*Primary Examiner* — Cynthia K Walls
(74) *Attorney, Agent, or Firm* — WHDA, LLP

(57) ABSTRACT

A nonaqueous electrolyte secondary battery includes a positive electrode containing a lithium transition metal oxide as a positive electrode active material, a negative electrode containing a carbon material as a negative electrode active material, and a nonaqueous electrolyte. The lithium transition metal oxide contains W and Si, and W and Si adhere to the surface of the carbon material constituting the negative electrode active material. The amount of W adhering to the surface of the carbon material is 2 times or less in terms of a molar ratio to the amount of Si adhering to the surface of the carbon material.

7 Claims, 1 Drawing Sheet

(51) Int. Cl.
*H01M 4/38* (2006.01)
*H01M 4/505* (2010.01)
*H01M 4/587* (2010.01)
*H01M 10/0525* (2010.01)

(58) Field of Classification Search
CPC ...... H01M 4/485; H01M 4/133; H01M 4/131; Y02E 60/10
See application file for complete search history.

(56) References Cited

FOREIGN PATENT DOCUMENTS

| | | |
|---|---|---|
| JP | 2012-238581 A | 12/2012 |
| JP | 2013-246992 A | 12/2013 |
| JP | 2014-207058 A | 10/2014 |

\* cited by examiner

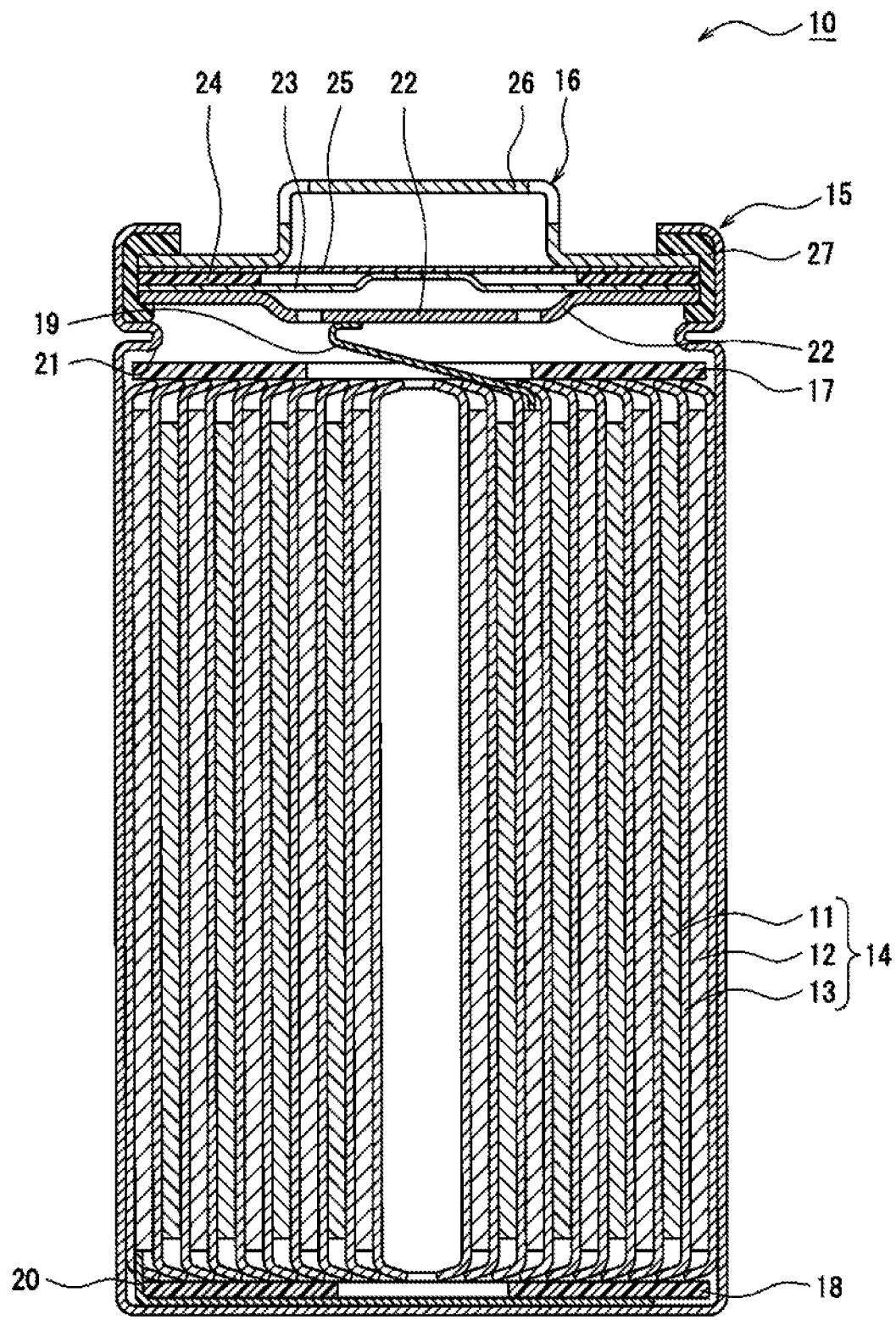

NONAQUEOUS ELECTROLYTE SECONDARY BATTERY

TECHNICAL FIELD

The present disclosure relates to a nonaqueous electrolyte secondary battery.

BACKGROUND ART

It has recently been known that the output characteristics of nonaqueous electrolyte secondary batteries are improved by using, as a positive electrode active material, a lithium transition metal oxide containing W. For example, Patent Literature 1 discloses a positive electrode active material containing a composite oxide of at least one element selected from W, Mo, Nb, and Ta, which is present on the surfaces of particles of a lithium transition metal oxide containing Ni, Co, and Mn. Patent Literature 1 describes that by using the positive electrode active material, the output characteristics and storage characteristics of a battery are improved.

CITATION LIST

Patent Literature

PTL 1: Japanese Published Unexamined Patent Application No. 2012-238581

SUMMARY OF INVENTION

However, a nonaqueous electrolyte secondary battery using a lithium transition metal oxide containing W as a positive electrode active material has difficulty in realizing good low-temperature regeneration characteristics.

A nonaqueous electrolyte secondary battery according to an aspect of the present disclosure includes a positive electrode containing a lithium transition metal oxide as a positive electrode active material, a negative electrode containing a carbon material as a negative electrode active material, and a nonaqueous electrolyte, the lithium transition metal oxide containing W and Si, W and Si adhering to the carbon material, and the amount of W adhering to the surface of the carbon material is 2 times or less in terms of a molar ratio to the amount of Si adhering to the surface of the carbon material.

According to an aspect of the present disclosure, a nonaqueous electrolyte secondary battery using, as a positive electrode active material, a lithium transition metal oxide containing W can realize good low-temperature regeneration characteristics.

BRIEF DESCRIPTION OF DRAWING

Figure is a cross-sectional view of a nonaqueous electrolyte secondary battery as an example of an embodiment of the present invention.

DESCRIPTION OF EMBODIMENTS

As described above, by using, as a positive electrode active material, a lithium transition metal oxide containing W, the output characteristics of a battery are improved, while low-temperature regeneration characteristics may be significantly decreased. The main cause of decrease in low-temperature regeneration characteristics is considered to be the elution of W of a positive electrode and deposition on the surface of a negative electrode, thereby forming a high-resistance coating film.

As a result of earnest investigation conducted by the inventors for realizing good low-temperature regeneration characteristics in a nonaqueous electrolyte secondary battery using, as a positive electrode active material, a lithium transition metal oxide containing W, it was found that the problem can be solved by further adding a specified amount of Si to the lithium transition metal oxide. By using the lithium transition metal oxide containing W and Si, elution of W is suppressed, and a low-resistance coating film containing W and Si is formed on the negative electrode, thereby specifically improving the low-temperature regeneration characteristics.

A nonaqueous electrolyte secondary battery 10 which is a cylindrical battery including a cylindrical metal-made case is described below as an example of an embodiment of the present invention, but a nonaqueous electrolyte secondary battery of the present disclosure is not limited to this. The nonaqueous electrolyte secondary battery of the present disclosure may be, for example, a prismatic battery including a prismatic metal-made case, a laminate battery including an exterior body made of a resin-made sheet, or the like. In addition, a wound-type electrode body 14 formed by winding a positive electrode and a negative electrode with a separator interposed therebetween is described as an example of an electrode body constituting the nonaqueous electrolyte secondary battery, but the electrode body is not limited to this. The electrode body may be, for example, a laminated electrode body formed by alternately laminating a plurality of positive electrodes and a plurality of negative electrodes through separators.

Figure is a cross-sectional view of the nonaqueous electrolyte secondary battery 10. As shown in Figure, the nonaqueous electrolyte secondary battery 10 includes the electrode body 14 having a wound structure and a nonaqueous electrolyte (not shown). The electrode body 14 has a positive electrode 11, a negative electrode 12, and a separator 13, and is formed by spirally winding the positive electrode 11 and the negative electrode 12 through the separator 13. Hereinafter, one of the sides in the axial direction of the electrode body 14 may be referred to as "upper", and the other side in the axial direction may be referred to as "lower".

The positive electrode 11, the negative electrode 12, and the separator 13, which constitute the electrode body 14, are formed in a strip shape and are spirally wound to be in a state of being alternately laminated in the radial direction of the electrode body 14. In the electrode body 14, the longitudinal direction of each of the electrodes is the winding direction, and the width direction of each of the electrodes is the axial direction. A positive electrode lead 19 which electrically connects the positive electrode 11 to a positive electrode terminal is connected to, for example, a central portion in the longitudinal direction of the positive electrode 11, and is extended outward from the upper end of the electrode group. A negative electrode lead 20 which electrically connects the negative electrode 12 to a negative electrode terminal is connected to, for example, an end portion in the longitudinal direction of the negative electrode 12, and is extended outward from the lower end of the electrode group.

In the example shown in Figure, a case body 15 and a sealing body 16 constitute a metal-made battery case which houses the electrode body 14 and the nonaqueous electrolyte. Insulating plates 17 and 18 are provided above and below, respectively, the electrode body 14. The positive electrode lead 19 is extended to the sealing body 16 side through a through hole of the insulating plate 17 and is welded to the lower surface of a filter 22 serving as the bottom plate of the sealing body 16. In the nonaqueous electrolyte secondary battery 10, a cap 26 of the sealing body 16 electrically connected to the filter 22 serves as the positive electrode terminal. On the other hand, the negative electrode lead 20 is extended to the bottom side of the case body 15 and is welded to the inner surface of the bottom of the case body 15. In the nonaqueous electrolyte secondary battery 10, the case body 15 serves as the negative electrode terminal.

The case body 15 is a metal-made container having a bottomed cylindrical shape. A gasket 27 is provided between the case body 15 and the sealing body 16, securing the inside sealability of the battery case. The case body 15 has a projecting part 21 which is formed by, for example, pressing the side surface from the outside and supports the sealing body 16. The projecting part 21 is preferably formed in an annular shape along the peripheral direction of the case body 15 so as to support the sealing body 16 by the upper surface thereof.

The sealing body 16 has a structure in which the filter 22, a lower valve body 23, an insulating member 24, an upper valve body 25, and the cap 26 are laminated in order from the electrode body 14 side. Each of the members constituting the sealing body 16 has, for example, a disc shape or a ring shape, and these members excluding the insulating member 24 are electrically connected to each other. The lower valve body 23 and the upper valve body 25 are connected to each other at the central portions thereof, and the insulating member 24 is interposed between the peripheral portions thereof. A vent hole is provided in the lower valve body 23, and thus when the pressure in the battery is increased by abnormal heat generation, the upper valve body 25 is expanded to the cap 26 side and is separated from the lower valve body 23, thereby cutting off the electric connection between both valve bodies. When the internal pressure is further increased, the upper valve body 25 is broken, and gas is discharged from an opening of the cap 26.

The constituent elements (the positive electrode 11, the negative electrode 12, and the separator 13) of the electrode body 14 and the nonaqueous electrolyte, particularly, the positive electrode 11 and the negative electrode 12, are described in detail below.

[Positive Electrode]

The positive electrode 11 has a positive electrode current collector and a positive electrode mixture layer formed on the positive electrode current collector, and contains a lithium transition metal oxide as a positive electrode active material. A metal foil of aluminum or the like, which is stable within the potential range of the positive electrode 11, a film having the metal disposed in a surface layer, or the like can be used as the positive electrode current collector. The positive electrode mixture layer contains the positive electrode active material, a conductive material, and a binder. The positive electrode 11 can be formed by, for example, applying a positive electrode mixture slurry, containing the positive electrode active material, the conductive material, and the binder, on the positive electrode current collector, drying the coating film, and then rolling the coating film to form the positive electrode mixture layers on both surfaces of the current collector.

The lithium transition metal oxide constituting the positive electrode active material contains W (tungsten) and Si (silicon). By using the lithium transition metal oxide containing W and Si, as described above, the low-temperature regeneration characteristics of the battery can be improved. When the lithium transition metal oxide contains only W or only Si, the effect of improving the low-temperature regeneration characteristics of the battery cannot be achieved, while only when containing both elements of W and Si, the low-temperature regeneration characteristics can be specifically improved. One lithium transition metal oxide may be used or two or more types may be used in combination.

The average particle diameter of primary particles constituting the lithium transition metal oxide is, for example, 0.1 µm or more and preferably 1 µm or more. By using of the primary particles having an average particle diameter of 1 µm or more, elution of W is suppressed, and the effect of improving the low-temperature regeneration characteristics becomes more remarkable. The average particle diameter of the primary particles is, for example, 0.1 µm to 10 µm. The lithium transition metal oxide may be composed of secondary particles formed by aggregation of the primary particles. The average particle diameter of the primary particles can be measured by observing the lithium transition metal oxide with a scanning electron microscope (SEM). Specifically, 100 primary particles are randomly selected in a SEM image, and the diameters of the circumcircles of the particles are measured and averaged to calculate the average particle diameter.

Examples of the metal elements contained in the lithium transition metal oxide include, besides Li, W, and Si, Co (cobalt), Ni (nickel), Mn (manganese), B (boron), Mg (magnesium), Al (aluminum), Ti (titanium), V (vanadium), Cr (chromium), Fe (iron), Cu (copper), Zn (zinc), Ga (gallium), Sr (strontium), Zr (zirconium), Nb (niobium), In (indium), Sn (tin), Ta (tantalum), and the like.

The lithium transition metal oxide preferably contains 10 mol % or more of Mn relative to the total amount of the transition metals. In this case, elution of W is further suppressed, and the effect of improving the low-temperature regeneration characteristics becomes remarkable. The lithium transition metal oxide is preferably a composite oxide containing, besides Li, W, Si, and Mn, at least one element selected from Ni, Co, and Al. Examples of the preferred lithium composite oxide include composite oxides represented by general formula (1) $LiNiCoMnWSiO_2$ and general formula (2) $LiNiCoAlWSiO_2$, and a composite oxide represented by the general formula (1) is particularly preferred.

W and Si contained in the lithium transition metal oxide may adhere to the surfaces of oxide particles, but are preferably present as a solid solution in the composite oxide. In the case of a solid solution of W and Si in the composite oxide, the effect of improving the low-temperature regeneration characteristics becomes more remarkable. The term "solid solution of W and Si" represents a state (state of being present in a crystal) where W and Si are present by partially substituting the transition metal elements in the composite oxide. The presence and amount of a solid solution of W and Si can be confirmed by cutting the oxide particles or scraping the surfaces of the particles and performing Auger electron spectroscopy (AES) or transmission electron microscope (TEM)-energy dispersive X-ray spectrometry (EDX) of the insides of the particles.

The content of each of W and Si in the lithium transition metal oxide is preferably 0.01 mol % to 3 mol %, more preferably 0.05 mol % to 2 mol %, and particularly preferably 0.1 mol % to 1.5 mol % relative to the total molar amount of the transition metals contained in the oxide. As long as the content of each of W and Si is within the range, the low-temperature regeneration characteristics can be efficiently improved without a decrease in positive electrode capacity.

A method for forming a solid solution of W and Si in the lithium transition metal oxide is, for example, a method of mixing and firing the composite oxide containing Ni, Co, Mn, and Al, etc., a lithium compound such as lithium hydroxide, lithium carbonate, or the like, a tungsten compound such as tungsten oxide or the like, and s silicon compound such as silicon oxide or the like. The firing temperature is, for example, 800° C. to 1000° C. The composite oxide represented by the general formula (1) can be synthesized by firing at a higher temperature and thus the formation of a solid solution of W and Si more easily proceeds as compared with the case of the composite oxide represented by the general formula (2).

Examples of the conductive material constituting the positive electrode mixture layer include carbon materials such as carbon black (CB), acetylene black (AB), Ketjen black, graphite, and the like. Examples of the binder constituting the positive electrode mixture layer include fluorocarbon resins such as polytetrafluoroethylene (PTFE), polyvinylidene fluoride (PVdF), and the like, polyacrylonitrile (PAN), polyimide resins, acrylic resins, polyolefin resins, and the like. These may be used alone or in combination of two or more.

[Negative Electrode]

The negative electrode 12 has a negative electrode current collector and a negative electrode mixture layer formed on the negative electrode current collector, and contains a carbon material as a negative electrode active material. A metal foil of copper or the like, which is stable within the potential range of the negative electrode 12, a film having the metal disposed in a surface layer, or the like can be used as the negative electrode current collector. The negative electrode mixture layer contains the negative electrode active material and a binder. The negative electrode 12 can be formed by, for example, applying a negative electrode mixture slurry, which contains the negative electrode active material and the binder, on the negative electrode current collector, drying the coating film, and then rolling the coating film to form the negative electrode mixture layers on both surfaces of the current collector.

The negative electrode 12 contains at least the carbon material as the negative electrode active material. Examples of the carbon material constituting the negative electrode active material include graphite (may be either natural graphite or artificial graphite), amorphous carbon, and the like. Graphite is preferably used as the negative electrode active material. The carbon material such as graphite or the like may be used, as the negative electrode active material, in combination with a metal such as Si, Sn, or the like, which is alloyed with Li, an alloy containing a metal element such as Si, Sn, or the like, or a composite oxide. These carbon materials may be used alone or in combination of two or more.

The average particle diameter of particles of the carbon material, such as graphite or the like, constituting the negative electrode active material is, for example, 1 μm to 30 μm. In the nonaqueous electrolyte secondary battery 10, W and Si adhere to the surface of the carbon material. In this case, W and Si are derived from W and Si in the lithium transition metal oxide used as the positive electrode active material, and W and Si in the oxide are eluted and adhere to the surfaces of carbon material particles. The amount by molar ratio of W adhering to the surfaces of the carbon material is 2 times or less as large as the amount of Si adhering to the surfaces of the carbon material. The amount of each of W and Si present on the surfaces of the carbon material can be measured by using ICP, SEM-EDX, TEM-EDX, and the like.

As described above, elution of W is suppressed by adding Si to the lithium transition metal oxide containing W, but even when Si is added, W and Si are partially eluted and deposited on the surfaces of the carbon material, forming a coating film containing W and Si. The coating film has a lower resistance than a coating film (coating film not containing Si) formed when Si is not added to the lithium transition metal oxide, and thus the low-temperature regeneration characteristics of the battery are considered to be improved.

As described above, the molar ratio (W/Si) of W to Si on the surfaces of the carbon material such as graphite or the like is 2.0 or less, preferably 1.9 or less, and more preferably 1.8 or less. An example of the preferred range of the molar ratio (W/Si) is 0.1 to 2.0, 0.3 to 1.9, or 0.69 to 1.8. When the molar ratio (W/Si) of W to Si on the surfaces of the carbon material exceeds 2.0, the effect of improving the low-temperature regeneration characteristics cannot be obtained, while when the molar ratio (W/Si) is 2.0 or less, the low-temperature regeneration characteristics are specifically improved. On the other hand, when the molar ratio (W/Si) is less than 0.1, the effect of improving the low-temperature regeneration characteristics tends to be decreased.

The amount of Si adhering to the surfaces of the carbon material such as graphite or the like is preferably $50 \times 10^{-6}$ or less, more preferably $20 \times 10^{-6}$ or less, and still more preferably $10 \times 10^{-6}$ or less in terms of molar ratio to the carbon material. When the amount of Si present on the surfaces of the carbon material exceeds $50 \times 10^{-6}$ in terms of a molar ratio to the carbon material, the resistance is increased due to the excessively thick coating film, and the low-temperature regeneration characteristics tend to be decreased. That is, it is preferred that Si is present in an amount of $50 \times 10^{-6}$ or less on the surfaces of the carbon material, and W is present in such an amount that the molar ratio (W/Si) of W to Si is 2.0 or less. The amount of W adhering to the surfaces of the carbon material is, for example, preferably $100 \times 10^{-6}$ or less, more preferably $50 \times 10^{-6}$ or less, and still more preferably $20 \times 10^{-6}$ or less in terms of a molar ratio to the carbon material.

Like in the positive electrode 11, usable examples of the binder constituting the negative electrode mixture layer include fluorine-based resins, PAN, polyimide resins, acrylic resins, polyolefin resins, and the like. When the negative electrode mixture slurry is prepared by using an aqueous solvent, styrene-butadiene rubber (SBR), carboxymethyl cellulose (CMC) or a salt thereof, polyacrylic acid (PAA) or a salt thereof, polyvinyl alcohol (PVA), or the like may be used.

[Separator]

A porous sheet having ion permeability and insulation can be used as the separator 13. Examples of the porous sheet include a microporous thin film, a woven fabric, a nonwoven fabric, and the like. Preferred examples of a material of the separator 13 include olefin resins such as polyethylene, polypropylene, a copolymer containing at least one of ethylene and propylene, and the like, cellulose, and the like. The separator may be a laminate having a cellulose fiber layer and a thermoplastic resin fiber layer of an olefin resin or the like. Also, the separator may be a multilayer separator including a polyethylene layer and a polypropylene layer, and a separator having a surface coated with an aramid resin or the like may be used.

In addition, a heat resistant layer containing a filler of an inorganic compound may be formed at the interface between the separator 13 and at least one of the positive electrode 11 and the negative electrode 12. Examples of the inorganic compound filler include oxides, phosphoric acid compounds, and the like, which each contain at least one of titanium (Ti), aluminum (Al), silicon (Si), and magnesium (Mg). The heat resistant layer can be formed by, for example, applying a slurry containing the filler on the surface of the positive electrode 11, the negative electrode 12, or the separator 13.

[Nonaqueous Electrolyte]

The nonaqueous electrolyte contains a nonaqueous solvent and an electrolyte salt dissolved in the nonaqueous solvent. The nonaqueous electrolyte is not limited to a liquid electrolyte (nonaqueous electrolytic solution) and may be a solid electrolyte using a gel polymer or the like. Usable examples of the nonaqueous solvent include esters, ethers, nitriles such as acetonitrile and the like, amides such as dimethylformamide and the like, mixed solvents of two or more of these solvents, and the like. The nonaqueous solvent may contain a halogen-substituted compound produced by substituting at least a portion of hydrogen of the solvent with a halogen atom such as fluorine or the like.

Examples of the esters include cyclic carbonate esters such as ethylene carbonate (EC), propylene carbonate (PC), butylene carbonate, and the like; chain carbonate esters such as dimethyl carbonate (DMC), methylethyl carbonate (EMC), diethyl carbonate (DEC), methylpropyl carbonate, ethylpropyl carbonate, methylisopropyl carbonate, and the like; cyclic carboxylate esters such as γ-butyrolactone, γ-valerolactone; chain carboxylate esters such as methyl acetate, ethyl acetate, propyl acetate, methyl propionate (MP), ethyl propionate, γ-butyrolactone, and the like; and the like.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, a crown ether, and the like; chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, tetraethylene glycol dimethyl ether, and the like; and the like.

Preferred examples of the halogen-substituted compound include fluorinated cyclic carbonate esters such as fluoroethylene carbonate (FEC) and the like, fluorinated chain carbonate esters, fluorinated chain carboxylate esters such as methyl fluoropropionate (FMP) and the like, and the like.

The electrolyte salt is preferably a lithium salt. Examples of the lithium salt include boric acid salts such as $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)$ F), $LiPF_{6-x}(C_nF_{2n+1})_x$ ($1<x<6$, and n is 1 or 2), $LiB_{10}Cl_{10}$, LiCl, LiBr, LiI, LiBCl, $Li_2B_4O_7$, $Li(B(C_2O_4)F_2)$, and the like; imide salts such as $LiN(SO_2CF_3)_2$, $LiN(C_lF_{2l+1}SO_2)(C_nF_{2n+1}SO_2)$ {l and m are each an integer of 1 or more}, and the like. These lithium salts may be used alone or as a mixture of a plurality of types. Among these, from the viewpoint of ionic conductivity, electrochemical stability, etc., $LiPF_6$ is preferably used. The concentration of the lithium salt is preferably 0.8 to 1.8 mole per L of the nonaqueous solvent.

EXAMPLES

The present disclosure is described in further detail by examples below, but the present disclosure is not limited to these examples.

Example 1

[Synthesis of Positive Electrode Active Material]

A nickel-cobalt-manganese composite hydroxide produced by coprecipitation was fired at 500° C. to produce a nickel-cobalt-manganese composite oxide. Next, lithium carbonate, the nickel-cobalt-manganese composite oxide, tungsten oxide ($WO_3$), and silicon oxide ($SiO_2$) were mixed with a Ishikawa-type grinding mortar so that the molar ratio of Li, the total of Ni, Co, and Mn, W in WO, and Si in $SiO_2$ was 1.15:1:0.005:0.005. The resultant mixture was fired at 900° C. for 20 hours in an air atmosphere and then ground to produce a lithium transition metal oxide (positive electrode active material) containing W and Si as a solid solution. The solid solution of W and Si in the composite oxide was confirmed by TEM-EDX. Also, the primary particle diameter (average particle diameter according to SEM observation) of the lithium transition metal oxide was 0.5 μm.

[Formation of Positive Electrode]

The positive electrode active material, acetylene black, and polyvinylidene fluoride were mixed at a mass ratio of 91:7:2, and a proper amount of N-methyl-2-pyrrolidone was added to the resultant mixture and then kneaded to prepare a positive electrode mixture slurry. The positive electrode mixture slurry was applied to both surfaces of a positive electrode current collector composed of an aluminum foil, and the coating films were dried and then rolled by a rolling roller. Further, a current collector tab made of aluminum was attached to form a positive electrode having positive electrode mixture layers formed on both surfaces of the positive electrode current collector.

[Formation of Negative Electrode]

A graphite powder (negative electrode active material), carboxymethyl cellulose (CMC), and styrene-butadiene rubber (SBR) were mixed at a mass ratio of 98.7:0.7:0.6, and a proper amount of water was added to the resultant mixture and then kneaded to prepare a negative electrode mixture slurry. The negative electrode mixture slurry was applied to both surfaces of a negative electrode current collector composed of a copper foil, and the coating films were dried and then rolled by a rolling roller. Further, a current collector tab made of nickel was attached to form a negative electrode having negative electrode mixture layers formed on both surfaces of the negative electrode current collector.

[Preparation of Nonaqueous Electrolyte]

Ethylene carbonate (EC), methylethyl carbonate (MEC), and dimethyl carbonate (DMC) were mixed at a volume ratio of 3:3:4. In the mixed solvent, $LiPF_6$ was dissolved at a concentration of 1.2 mol/L to prepare an electrolytic solution.

[Formation of Battery]

The positive electrode and the negative electrode were spirally wound through a separator made of polyethylene to form a wound-type electrode body. The resultant electrode body was housed in a metal-made case body having a bottomed cylindrical shape, and the upper end of a positive electrode lead and the lower end of a negative electrode lead were welded to the bottom of a sealing body and the inner surface of the bottom of the case body, respectively. Then, the nonaqueous electrolytic solution was injected into the case body, and an opening of the case body was sealed with the sealing body through a gasket, forming a cylindrical battery. The resultant cylindrical battery was aged at 75° C. for 24 hours in the state of being charged to 60% of the charge capacity.

The cylindrical battery aged was charged and discharged at 4.1 V to 2.5 V and then disassembled to measure, by using ICP, the amount of W present on the surfaces of the graphite particles used as the negative electrode active material. The amount of W shown in Table 1 is shown by the molar ratio to the carbon material. Similarly, the amount of Si present on the surfaces of the graphite particles was measured, and the Si/C ratio (molar ratio) and W/S ratio (molar ratio) shown in Table 1 were determined.

Example 2

A cylindrical battery was formed by the same method as in Example 1 except that in synthesizing a positive electrode active material, the amount of $SiO_2$ added was changed so that the content of Si in the positive electrode active material was 0.3 mol %.

Example 3

A cylindrical battery was formed by the same method as in Example 1 except that in synthesizing a positive electrode active material, the amount of $WO_3$ added was changed so that the content of W in the positive electrode active material was 1 mol %.

Example 4

A cylindrical battery was formed by the same method as in Example 1 except that the aging temperature of the cylindrical battery was 45° C.

Example 5

A cylindrical battery was formed by the same method as in Example 1 except that in synthesizing a positive electrode active material, a mixture of lithium carbonate, the nickel-cobalt-manganese composite oxide, and $WO_3$ was fired at 900° C. for 20 hours in an air atmosphere, and then $SiO_2$ was added, followed by heat treatment at 300° C. for 1 hour. In this example, it was confirmed that the lithium transition metal oxide in the positive electrode active material contains Si, but a solid solution of Si was not confirmed.

Comparative Example 1

A cylindrical battery was formed by the same method as in Example 1 except that in synthesizing a positive electrode active material, $WO_3$ and $SiO_2$ were not added.

Comparative Example 2

A cylindrical battery was formed by the same method as in Example 1 except that in synthesizing a positive electrode active material, $SiO_2$ was not added.

Comparative Example 3

A cylindrical battery was formed by the same method as in Example 1 except that in synthesizing a positive electrode active material, $WO_3$ was not added.

Comparative Example 4

A cylindrical battery was formed by the same method as in Comparative Example 1 except that the aging temperature of the cylindrical battery was 25° C.

Comparative Example 5

A cylindrical battery was formed by the same method as in Example 1 except that the aging temperature of the cylindrical battery was 25° C.

Comparative Example 6

A cylindrical battery was formed by the same method as in Example 1 except that in synthesizing a positive electrode active material, $Nb_2O_5$ was added in place of $SiO_2$.

Comparative Example 7

A cylindrical battery was formed by the same method as in Example 1 except that in synthesizing a positive electrode active material, $ZrO_2$ was added in place of $SiO_2$.

Example 6

A cylindrical battery was formed by the same method as in Example 1 except that in synthesizing a positive electrode active material, the composition of the nickel-cobalt-manganese composite oxide was changed so that the base composition of the lithium transition metal oxide was $Li_{1.01}Ni_{0.79}Co_{0.1}Mn_{0.1}$.

Comparative Example 8

A cylindrical battery was formed by the same method as in Comparative Example 2 except that in synthesizing a positive electrode active material, the composition of the nickel-cobalt-manganese composite oxide was changed so that the base composition of the lithium transition metal oxide was $Li_{1.01}Ni_{0.79}Co_{0.1}Mn_{0.1}$.

Example 7

A cylindrical battery was formed by the same method as in Example 1 except that in synthesizing a positive electrode active material, the composition of the nickel-cobalt-manganese composite oxide was changed so that the base composition of the lithium transition metal oxide was $Li_{1.01}Ni_{0.31}Co_{0.15}Al_{0.03}$, and the firing temperature was 800° C.

Comparative Example 9

A cylindrical battery was formed by the same method as in Comparative Example 2 except that in synthesizing a positive electrode active material, the composition of the nickel-cobalt-manganese composite oxide was changed so that the base composition of the lithium transition metal oxide was $Li_{1.01}Ni_{0.81}Co_{0.15}Al_{0.03}$, and the firing temperature was 800° C.

Example 8

A cylindrical battery was formed by the same method as in Example 1 except that in synthesizing a positive electrode active material, the firing temperature was changed to 1000° C. so that the primary particle diameter of the lithium transition metal oxide was 1.0 μm.

Comparative Example 10

A cylindrical battery was formed by the same method as in Comparative Example 2 except that in synthesizing a positive electrode active material, the firing temperature was changed to 1000° C. so that the primary particle diameter of the lithium transition metal oxide was 1.0 μm.

Each of the batteries of the examples and the comparative examples was evaluated for the low-temperature regeneration retention rate by the following method, and the evaluation results are shown in Table 1.

[Evaluation of Low-Temperature Regeneration Retention Rate]

Each of the batteries was charged at a constant current value of 800 mA under the temperature condition of 25° C. until the battery voltage was 4.1 V, and then charged at a constant voltage of 4.1 V until the current value was 40 mA. Then, the battery was discharged at a constant current of 800 mA until the battery voltage was 2.5 V. In this constant-current discharge (initial), the discharge capacity was regarded as the rated capacity of the battery. Then, the charge-discharge cycle was repeated 500 times under the temperature condition of 60° C.

Next, each of the batteries was discharged at a constant current of 800 mA at the battery temperature of 25° C. until the battery voltage was 2.5 V, and again charged to 50% of the rated capacity. Then, the low-temperature regeneration value at 50% of the state of charge (SOC) of each battery was determined from the maximum current value at which charging could be performed for 10 seconds with the charge termination voltage of 4.3 V at a battery temperature of −30° C. according to the following formula.

Low-temperature regeneration value (SOC 50%)=measured maximum current value/charge termination voltage (4.3 V)

The change in low-temperature regeneration value before and after the charge-discharge cycles (low-temperature regeneration value after cycles×100/low-temperature regeneration value before cycles) was calculated as the low-temperature regeneration retention rate.

TABLE 1

| | Positive electrode | | | | | Negative electrode | | | Battery | |
|---|---|---|---|---|---|---|---|---|---|---|
| | Active material base composition | W mol % | Si mol % | Si solid solution | Primary particle diameter | W/C molar ratio | Si/C molar ratio | W/Si molar ratio | Aging | Low-temperature regeneration % |
| Example 1 | $Li_{1.07}Ni_{0.45}Co_{0.26}Mn_{0.22}$ | 0.5 | 0.5 | Yes | 0.5 μm | $4.7 \times 10^{-6}$ | $6.8 \times 10^{-6}$ | 0.69 | 75° C. | 93 |
| Example 2 | $Li_{1.07}Ni_{0.45}Co_{0.26}Mn_{0.22}$ | 0.5 | 0.3 | Yes | 0.5 μm | $6.2 \times 10^{-6}$ | $6.8 \times 10^{-6}$ | 0.91 | 75° C. | 92 |
| Example 3 | $Li_{1.07}Ni_{0.45}Co_{0.26}Mn_{0.22}$ | 1 | 0.5 | Yes | 0.5 μm | $8.7 \times 10^{-6}$ | $6.8 \times 10^{-6}$ | 1.27 | 75° C. | 90 |
| Example 4 | $Li_{1.07}Ni_{0.45}Co_{0.26}Mn_{0.22}$ | 0.5 | 0.5 | Yes | 0.5 μm | $7.4 \times 10^{-6}$ | $4.3 \times 10^{-6}$ | 1.74 | 45° C. | 89 |
| Example 5 | $Li_{1.07}Ni_{0.45}Co_{0.26}Mn_{0.22}$ | 0.5 | 0.5 | No | 0.5 μm | $6.6 \times 10^{-6}$ | $6.0 \times 10^{-6}$ | 1.10 | 75° C. | 90 |
| Comparative Example 1 | $Li_{1.07}Ni_{0.45}Co_{0.26}Mn_{0.22}$ | 0 | 0 | No | 0.5 μm | — | — | — | 75° C. | 84 |
| Comparative Example 2 | $Li_{1.07}Ni_{0.45}Co_{0.26}Mn_{0.22}$ | 0.5 | 0 | No | 0.5 μm | $12.4 \times 10^{-6}$ | — | — | 75° C. | 80 |
| Comparative Example 3 | $Li_{1.07}Ni_{0.45}Co_{0.26}Mn_{0.22}$ | 0 | 0.5 | Yes | 0.5 μm | — | $7.3 \times 10^{-6}$ | — | 75° C. | 83 |
| Comparative Example 4 | $Li_{1.07}Ni_{0.45}Co_{0.26}Mn_{0.22}$ | 0 | 0 | No | 0.5 μm | — | — | — | 25° C. | 82 |
| Comparative Example 5 | $Li_{1.07}Ni_{0.45}Co_{0.26}Mn_{0.22}$ | 0.5 | 0.5 | Yes | 0.5 μm | $5.2 \times 10^{-6}$ | $2.1 \times 10^{-6}$ | 2.44 | 25° C. | 84 |
| Comparative Example 6 | $Li_{1.07}Ni_{0.45}Co_{0.26}Mn_{0.22}$ | 0.5 | Nb: 0.5 | No | 0.5 μm | $13.0 \times 10^{-6}$ | — | — | 75° C. | 80 |
| Comparative Example 7 | $Li_{1.07}Ni_{0.45}Co_{0.26}Mn_{0.22}$ | 0.5 | Zr: 0.5 | No | 0.5 μm | $12.7 \times 10^{-6}$ | — | — | 75° C. | 81 |
| Example 6 | $Li_{1.01}Ni_{0.79}Co_{0.1}Mn_{0.1}$ | 0.5 | 0.5 | Yes | 0.5 μm | $5.6 \times 10^{-6}$ | $6.8 \times 10^{-6}$ | 0.82 | 75° C. | 90 |
| Comparative Example 8 | $Li_{1.01}Ni_{0.79}Co_{0.1}Mn_{0.1}$ | 0.5 | 0 | No | 0.5 μm | $13.0 \times 10^{-6}$ | — | — | 75° C. | 83 |
| Example 7 | $Li_{1.01}Ni_{0.81}Co_{0.15}Mn_{0.03}$ | 0.5 | 0.5 | Yes | 0.5 μm | $10.9 \times 10^{-6}$ | $6.4 \times 10^{-6}$ | 1.70 | 75° C. | 82 |
| Comparative Example 9 | $Li_{1.01}Ni_{0.81}Co_{0.15}Mn_{0.03}$ | 0.5 | 0 | No | 0.5 μm | $13.6 \times 10^{-6}$ | — | — | 75° C. | 79 |
| Example 8 | $Li_{1.07}Ni_{0.45}Co_{0.26}Mn_{0.22}$ | 0.5 | 0.5 | Yes | 1 0 μm | $3.0 \times 10^{-6}$ | $5.6 \times 10^{-6}$ | 0.54 | 75° C. | 98 |
| Comparative Example 10 | $Li_{1.07}Ni_{0.45}Co_{0.26}Mn_{0.22}$ | 0.5 | 0 | No | 1.0 μm | $9.9 \times 10^{-6}$ | — | — | 75° C. | 84 |

Table 1 indicates that any one of the batteries of Examples 1 to 5 has the high low-temperature regeneration retention rate as compared with the batteries of Comparative Examples 1 to 7. That is, when the lithium transition metal oxide constituting the positive electrode active material contains W and Si and, W and Si adhere to the surfaces of the carbon material constituting the negative electrode active material, and the molar ratio (W/Si) of adhesion amount is 2.0 or less, the low-temperature regeneration characteristics are specifically improved. Also, a solid solution of Si in the lithium transition metal oxide causes the more remarkable effect of improving the low-temperature regeneration characteristics (refer to Examples 1 and 5). When the molar ratio (W/Si) exceeds 2.0 as shown in Comparative Example 5, and when Nb or Zr is used in place of Si as shown in Comparative Example 6 or 7, the low-temperature regeneration retention rate is decreased, thereby failing to obtain the effect of improving the low-temperature regeneration characteristics.

In addition, when the molar amount of Mn in the lithium transition metal oxide is 10 mol % or more, the low-temperature regeneration retention rate is enhanced, thereby causing the more remarkable effect of improving the low-temperature regeneration characteristics (refer to Examples 6 and 7 and Comparative Examples 8 and 9, etc.). Further, when as shown in Example 8 and Comparative Example 10, the average particle diameter of primary particles of the lithium transition metal oxide is 1 μm or more, the low-temperature regeneration retention rate is significantly improved.

REFERENCE SIGNS LIST 10 nonaqueous electrolyte secondary battery
11 positive electrode
12 negative electrode
13 separator
14 electrode body
15 case body
16 sealing body
17, 18 insulating plate
19 positive electrode lead
20 negative electrode lead
21 projecting part
22 filter
23 lower valve body
24 insulating member
25 upper valve body
26 cap
27 gasket

The invention claimed is:

1. A nonaqueous electrolyte secondary battery comprising:
a positive electrode containing a lithium transition metal oxide as a positive electrode active material;
a negative electrode containing a carbon material as a negative electrode active material; and
a nonaqueous electrolyte, wherein the lithium transition metal oxide contains W and Si;
W and Si adhere to the surface of the carbon material; and
the amount of W adhering to the surface of the carbon material is 2 times or less in terms of a molar ratio to the amount of Si adhering to the surface of the carbon material,
wherein the amount of Si adhering to the surface of the carbon material is $50 \times 10^{-6}$ or less in terms of molar ratio to the carbon material.

2. The nonaqueous electrolyte secondary battery according to claim 1, wherein the lithium transition metal oxide contains W and Si as a solid solution.

3. The nonaqueous electrolyte secondary battery according to claim 1, wherein the lithium transition metal oxide contains 10 mol % or more of Mn relative to the total amount of transition metals.

4. The nonaqueous electrolyte secondary battery according to claim 1, wherein the average particle diameter of primary particles constituting the lithium transition metal oxide is 1 μm or more and 10 μm or less.

5. A nonaqueous electrolyte secondary battery comprising:
a positive electrode containing a lithium transition metal oxide as a positive electrode active material;
a negative electrode containing a carbon material as a negative electrode active material; and
a nonaqueous electrolyte,
wherein the lithium transition metal oxide contains W and Si;
W and Si adhere to the surface of the carbon material; and
the amount of W adhering to the surface of the carbon material is 2 times or less in terms of a molar ratio to the amount of Si adhering to the surface of the carbon material,
wherein the lithium transition metal oxide contains W and Si as a solid solution.

6. The nonaqueous electrolyte secondary battery according to claim 5, wherein the lithium transition metal oxide contains 10 mol % or more of Mn relative to the total amount of transition metals.

7. The nonaqueous electrolyte secondary battery according to claim 5, wherein the average particle diameter of primary particles constituting the lithium transition metal oxide is 1 μm or more and 10 μm or less.

* * * * *